(12) United States Patent
Previdi et al.

(10) Patent No.: US 7,953,027 B2
(45) Date of Patent: May 31, 2011

(54) REROUTING MULTICAST TRAFFIC IN RESPONSE TO DETECTING IMMINENT NETWORK DISRUPTION

(75) Inventors: Stefano Previdi, Rome (IT); Dino Farinacci, San Jose, CA (US); Ijsbrand Wijnands, Leuven (BE); Arjen Boers, Sitges (ES)

(73) Assignee: Cisco Technology, Inc., San Jose, CA (US)

( * ) Notice: Subject to any disclaimer, the term of this patent is extended or adjusted under 35 U.S.C. 154(b) by 729 days.

(21) Appl. No.: 11/355,525

(22) Filed: Feb. 16, 2006

(65) Prior Publication Data

US 2007/0189193 A1    Aug. 16, 2007

(51) Int. Cl.
*H04L 12/28* (2006.01)
*H04L 12/56* (2006.01)
*H04J 3/26* (2006.01)
*G06F 15/16* (2006.01)

(52) U.S. Cl. ........ 370/256; 370/390; 370/392; 370/408; 370/432; 709/252

(58) Field of Classification Search ................ 370/256, 370/390, 392, 408, 432; 709/252
See application file for complete search history.

(56) References Cited

U.S. PATENT DOCUMENTS

| | | | | |
|---|---|---|---|---|
| 5,517,494 | A | 5/1996 | Green | 370/408 |
| 6,252,856 | B1 | 6/2001 | Zhang | 370/254 |
| 6,331,983 | B1 | 12/2001 | Haggerty et al. | 370/400 |
| 6,917,985 | B2 | 7/2005 | Madruga et al. | 709/238 |
| 7,310,335 | B1 | 12/2007 | Garcia-Luna-Aceves et al. | 370/390 |
| 2001/0034793 | A1 | 10/2001 | Madruga et al. | 709/238 |
| 2001/0037472 | A1 | 11/2001 | Li | 714/4 |
| 2002/0065886 | A1* | 5/2002 | Kim et al. | 709/205 |
| 2002/0120741 | A1* | 8/2002 | Webb et al. | 709/225 |
| 2002/0150094 | A1 | 10/2002 | Cheng et al. | 370/389 |
| 2003/0063608 | A1* | 4/2003 | Moonen | 370/390 |
| 2004/0105416 | A1* | 6/2004 | Rue | 370/338 |
| 2004/0205215 | A1* | 10/2004 | Kouvelas et al. | 709/231 |
| 2005/0201278 | A1 | 9/2005 | Banerjee et al. | 370/229 |
| 2006/0120327 | A1* | 6/2006 | Suh | 370/331 |
| 2006/0221861 | A1 | 10/2006 | Previdi et al. | 370/254 |
| 2006/0221866 | A1 | 10/2006 | Shepherd | 370/255 |
| 2006/0221975 | A1* | 10/2006 | Lo et al. | 370/395.5 |
| 2006/0250999 | A1 | 11/2006 | Zeng et al. | 370/312 |
| 2007/0019646 | A1 | 1/2007 | Bryant et al. | 370/390 |
| 2007/0091827 | A1 | 4/2007 | Boers et al. | 370/255 |

(Continued)

OTHER PUBLICATIONS

Boers, A., et al., *Format for Using PIM Proxies*, Internet Engineering Task Force (IEFT), Feb. 2006, pp. 1-7, http://www3.ietf.org/proceedings/05mar/IDs/draft-ietf-pim-proxy-00.txt.

(Continued)

*Primary Examiner* — Alpus H Hsu
*Assistant Examiner* — Saad Haasan
(74) *Attorney, Agent, or Firm* — Campbell Stephenson LLP

(57) ABSTRACT

Various systems and methods for rerouting multicast traffic in response to detecting imminent network disruption are disclosed. One method involves detecting an imminent topology change and, in response, identifying a new multicast distribution tree for a multicast group. A join message for the multicast group is then sent towards a root of the new multicast distribution tree. Multicast traffic addressed to the multicast group continues to be forwarded via the current multicast distribution tree, subsequent to sending the join message. The multicast traffic is not forwarded via the new multicast distribution tree until one or more multicast data packets have been received via the new multicast distribution tree.

18 Claims, 7 Drawing Sheets

U.S. PATENT DOCUMENTS

2007/0091891 A1* 4/2007 Zwiebel et al. .............. 370/390
2007/0140107 A1* 6/2007 Eckert et al. ................. 370/216
2007/0189193 A1 8/2007 Previdi et al. ................ 370/256
2008/0002693 A1* 1/2008 Moki et al. ................... 370/390

OTHER PUBLICATIONS

Boers, A., et al., *Format for Using TLVs in PIM Messages*, Internet Engineering Task Force (IETF), Oct. 2005, pp. 1-8, http://tools.ietf.org/wg/pim/draft-ietf-pim-join-attributes/draft-ietf-pim-join-attributes-00.txt.

Bonaventure, Olivier, et al., *Towards Multicast Fast Reroute*, Computing Science and Engineering Department, UCL, Nov. 21, 2005, pp. 1-75.

Aiguo Fei, et al., "A 'Dual Tree' Scheme for Fault—Tolerant Multicast," Proceedings of ICC, 2001, Helsinki (Finland), Jun. 11-14, 2001, XP010553091 © 2001, IEEE, pp. 690-694.

D. Estrin, Network Working Group—Request for Comments: 2362, "Protocol Independent Multicast-Sparse Mode (PIM-SM): Protocol Specification," Jun. 1998, pp. 1-67.

B. Cain et al., Network Working Group—Request for Comments: 3376, "Internet Group Management Protocol, Version 3," Oct. 2002, pp. 1-54.

Xu, Xiaohu, "Multicast in BGP/MPLS VPN," L3VPN Working Group, Huawei Technologies Co., Ltd., Oct. 17, 2005, http://www.watersprings.org/pub/id/draft-xu-l3vpn-2547bix-mcast-01.txt, pp. 1-11.

Xu, Xiaohu, E-mail entitled "RPF Checking for Fast Convergence of MVPN," Feb. 20, 2006, http://www.ietf.org./mail-archive/web/l3vpn/current/msg01434.html, pp. 1, 2.

Beichuan Zhang, "Host Multicast: A Framework for Delivering Multicast to End Users," Jun. 23-27, 2002, IEEE, vol. 3, pp. 1366-1375.

\* cited by examiner

REROUTING MULTICAST TRAFFIC IN RESPONSE TO DETECTING IMMINENT NETWORK DISRUPTION

FIELD OF THE INVENTION

This invention relates to networking and, more particularly, to multicast routing within a network.

DESCRIPTION OF THE RELATED ART

New multicast trees often need to be established when routing changes such as link or node failures and link or node restorations are detected. Any routing change that occurs in a network where multicast trees have been established may cause packet loss during the time required for the multicast routing protocol to establish a new multicast tree. Typically, a new multicast tree is established by sending prune messages to remove one or more nodes from an existing tree and then sending join messages to add one or more nodes to the new multicast tree. Between the time that the prune message is sent and the time that the join message is processed by an upstream node, packet loss is likely to occur.

In multicast networking systems, minimizing packet loss is an important goal. In current Internet Protocol (IP) multicast networks, convergence after a failure is typically relatively fast, and thus packet loss due to the failure can be minimized. However, some packet loss still occurs in response to failures.

Some events that are treated as failures are actually planned maintenance events. Many unicast routing protocols provide techniques for gracefully shutting down a node prior to removing the node for maintenance. Such techniques allow the unicast routing topology to be recalculated prior to removal of the node, thus preventing (or at least reducing) packet loss. Unfortunately, multicast routing protocols, such as PIM, currently do not support such techniques. Accordingly, new techniques are desirable for handling planned maintenance events in order to reduce the subsequent loss of multicast traffic.

BRIEF DESCRIPTION OF THE DRAWINGS

A more complete understanding of the present invention may be acquired by referring to the following description and the accompanying drawings, in which like reference numbers indicate like features.

Figure 1:
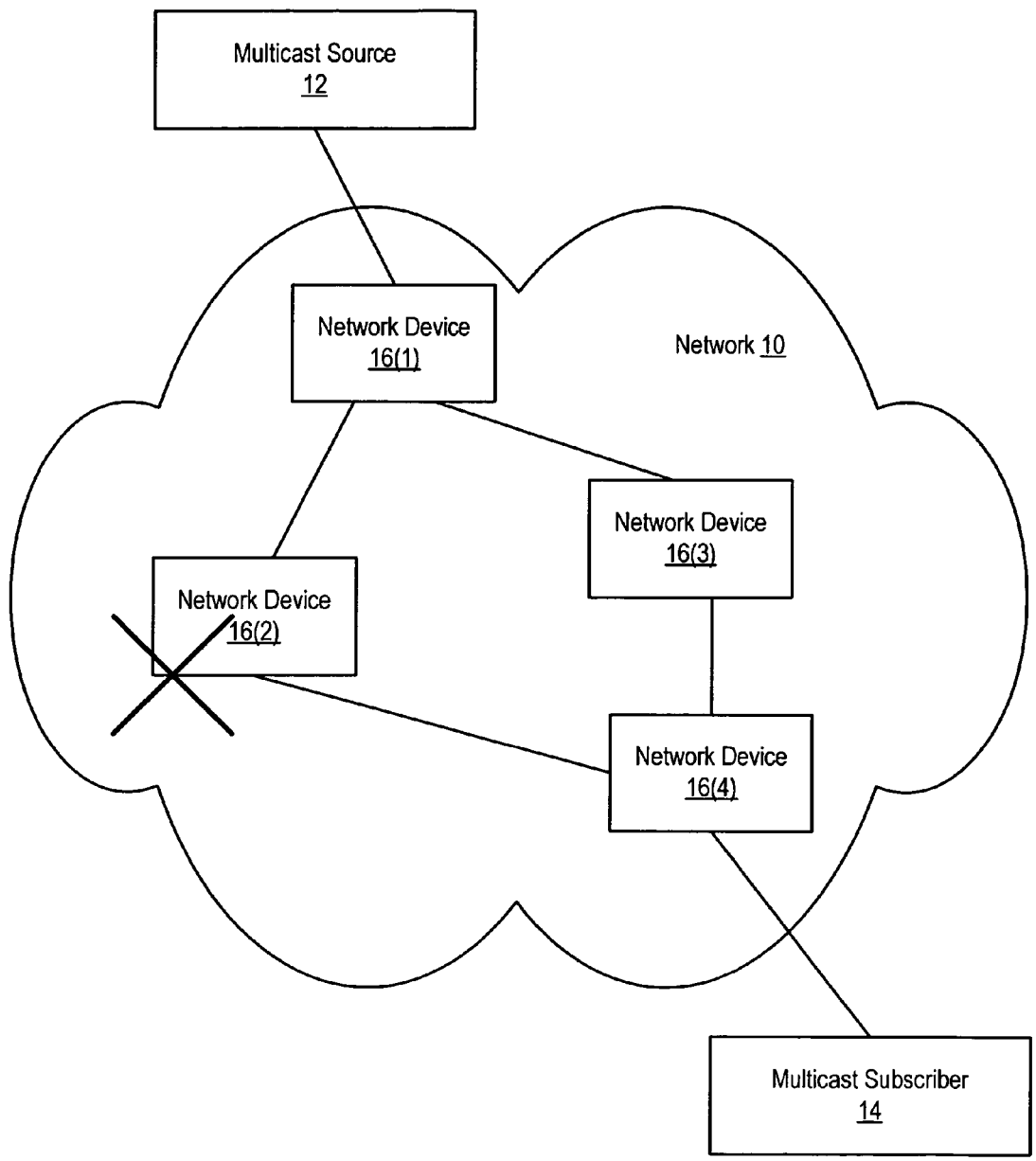
FIG. 1 shows a block diagram of a network, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

FIG. 1 illustrates a network that implements a protocol that supports multicast, such as Protocol Independent Multicast (PIM) or Distance Vector Multicast Routing Protocol (DVMRP). As used herein, PIM refers to any of a variety of different types of PIM, including Source Specific Multicast (PIM-SSM), Dense Mode (PIM-DM), Sparse Mode (PIM-SM), and Bidirectional (PIM-Bidir). The techniques described herein can also be used with any other multicast protocol that implements join- and prune-type messages (i.e., messages that are sent by a node in order to be added to or removed from a multicast tree).

As shown, a network 10 couples a multicast source 12 to a multicast subscriber 14. Network 10 can include one or more local area networks (LANs) and/or wide area networks (WANs). Network 10 can be implemented using any (or a combination) of a variety of different media, including wireless links, satellite links, coaxial cables, fiber optic cables, and the like. Network 10 includes several network devices 16(1)-16(4). Each network device can also be referred to as a node or network node.

As shown in FIG. 1, multicast source 12 is coupled to network device 16(1). Network device 16(1) is coupled to network device 16(2) and network device 16(3). Network device 16(2) and network device 16(3) are each coupled to network device 16(4). Network device 16(4) is coupled to multicast subscriber 14. It is noted that one device can be coupled to another device either directly by a physical link (as shown in FIG. 1) or indirectly by, for example, a logical tunnel or several physical links and intervening network devices.

Multicast source 12 is configured to send one or more data streams to a multicast group address G. Multicast source 12 is a computing device (e.g., a host computer system, personal digital assistant, cell phone, network appliance, network device, or the like) that encodes a data stream for transmission via network 10 and then sends messages containing the encoded data stream to subscribers via network 10. For example, multicast source 12 can be a video head end that receives a video stream, prepares that video stream for transmission, and sends messages that encode the video stream to subscribers via network 10. While FIG. 1 illustrates a single multicast source, it is noted that other embodiments can include multiple multicast sources that provide the same and/or different streams of data to the same and/or different multicast addresses. Additionally, a single multicast source can source several different streams of data to the same and/or different multicast addresses.

Multicast subscriber 14 is a computing device that subscribes to a multicast group G (e.g., by sending an Internet Group Management Protocol (IGMP) group report to network device 16(4), which causes network device 16(4) to generate a multicast group join according to, for example, Protocol Independent Multicast (PIM) Source Specific Multicast (SSM) protocol). Multicast subscriber 14 then receives a data stream addressed to multicast group G via network 10, decodes the data stream, and presents the decoded data stream to users (e.g., via a display device such as a monitor and/or an audio device such as a speaker). Multicast subscriber 14 can be a personal computer, personal digital assistant, cell phone, network appliance, set top box, and the like.

Network devices 16(1)-16(4) include various network devices (e.g., routers and/or switches) that perform routing functions and support a routing protocol. Each network device 16(1)-16(4) maintains one or more routing tables that stores routing information identifying routes to various data sources and/or data consumers. Each network device implements a multicast routing protocol that is used to convey multicast data packets from multicast source 12 to multicast subscriber 14. For each multicast group to which multicast source sends data, the multicast routing protocol can establish a multicast tree (also referred to as a multicast distribution tree), which is a group of coupled nodes that can convey packets from the multicast source to the multicast subscribers.

A path is a logical or physical communications pathway via which packets (such as multicast join and prune messages as well as multicast data packets) can be sent to a particular device. A path can include one or more physical or logical network links, as well as one or more network devices coupled to such network links. For purposes of this disclosure, a "packet" may include a cell, datagram, frame, message, segment, or any other logical group of information that is conveyed via a network. Network devices perform switching and routing functions in order to convey packets from a source to a destination along a path.

Network devices can be notified of certain topology changes before those changes actually occur, allowing the network devices to begin rerouting traffic prior to the actual changes in topology. This can reduce (or even prevent) packet loss. One way of signaling an imminent topology change involves the use of shutdown advertisements, as described in more detail below. Other techniques can be used to signal imminent topology changes in other embodiments.

Network devices and links within network 10 can be removed from network 10 (e.g., due to failure, maintenance, network reconfiguration, and the like). When a network device is to be removed from operation within network 10, that network device will first broadcast a shutdown advertisement throughout the network. For example, if network device 16(2) is to be removed from network 10 (as indicated by the "X" in FIG. 1), network device 16(2) can send a shutdown message to network devices 16(1) and 16(4). One of the recipients can then forward the shutdown message to network device 16(3). In this way, all of the other network devices can be notified that node 16(2) will be leaving the network.

The shutdown advertisement is a message that identifies that the sending network device (the network device that generated the shutdown advertisement) should no longer be used to route traffic. For example, in Intermediate System-to-Intermediate System (IS-IS), such a shutdown advertisement can be generated by setting the overload bit in link-state packets (LSPs) sent by a router (it is noted that the overload bit is generally used to advise other routers to not use the sending router when routing traffic, and thus can also be used in situations other than shutdown). After sending the shutdown advertisement, the sending network device can continue to operate normally for a specified duration (e.g., 60 seconds) before shutting down.

A network device can either be configured to send a shutdown advertisement automatically (e.g., in response to receiving a shutdown command from an administrator) or in response to administrator-provided commands (e.g., during the shutdown process, an administrator can manually configure the network device to send one or more shutdown advertisements, prior to actually shutting down the network device). The network device broadcasts the shutdown advertisement throughout the network (e.g., by sending the shutdown advertisement to an unknown address (in order to cause the advertisement to be flooded) or by sending the shutdown advertisement to a broadcast or multicast address). The techniques for generating a shutdown advertisement can be specified as part of a unicast routing protocol, such as IS-IS.

In some embodiments, shutdown advertisements include routing information that can be used to reroute unicast traffic around the network device that is leaving the network. A simple example of such routing information is information that simply indicates that the sending network device is no longer to be used in routing traffic (such as is found in the IS-IS shutdown advertisement described above). Such routing information can, in some embodiments, also include information identifying alternative routes that can be used to reroute traffic around the sending network device.

In response to receiving a shutdown advertisement, the receiving network devices (network devices 16(1), 16(3), and 16(4) in the example of FIG. 1) begin recalculating unicast routes so that traffic is no longer routed via the network device identified in the shutdown advertisement. For example, network device 16(4) can update a route used to forward packets to multicast source 12 so that the route no longer includes network device 16(2).

When the unicast routes are recalculated, some multicast routes may be affected. In particular, a change in the unicast routing topology may disrupt a multicast tree (i.e., a set of one or more paths via which multicast packets are sent from a multicast source to one or more multicast subscribers) for a particular multicast group. For example, changes to the unicast routing topology can lead to a change in the reverse path forwarding (RPF) interface used by at least some of the nodes in a multicast tree. The change in reverse path forwarding interface indicates that the affected nodes (i.e., the nodes for which a new RPF interface is identified) will need to switch from the old multicast distribution tree (which includes the network device that is leaving the network) to the new multicast distribution tree, which is includes the new RPF interface.

Thus, once an imminent topology change is detected (e.g., in response to receiving a shutdown advertisement), a routing protocol (either the multicast routing protocol or an underlying unicast routing protocol) determines whether any multicast trees are affected. If a multicast tree is affected, the multicast routing protocol will calculate a new multicast tree and begin switching traffic from the old tree to the new tree. For example, if PIM-SM is being implemented, PIM-SM will cause one or more nodes (network devices) along the current shortest path tree to send prune messages on the old tree (causing those nodes to be removed from that tree) and to send join messages on the new tree (causing those nodes to be added to the new tree).

When a multicast distribution tree will be affected by an imminent topology change identified in a shutdown advertisement, the affected nodes will delay sending prune messages on the old distribution tree until multicast traffic is received via the new multicast distribution tree. Between the time that the join message is sent on the new multicast distribution tree and the time that multicast traffic is received via the new multicast distribution tree, the multicast traffic will continue to be received and forwarded via the old multicast distribution tree.

To keep track of such a situation, the network devices that are switching from the old tree to the new tree can generate state information (e.g., in the form of a flag associated with the forwarding information for the multicast tree) that indicates whether a switchover from one tree to another is in progress. The network device can also update some, but not all, of its routing and/or forwarding information to identify the new multicast distribution tree. For example, instead of removing all state information corresponding to the old multicast distribution tree as soon as the switchover is initiated, a network device can maintain the multicast forwarding information (e.g., information identifying the RPF interface for the multicast group) so that the forwarding information continues to identify the old multicast distribution tree. A flag (also referred to as a "hold" flag) associated with this forwarding information can be set, however, to indicate that a switchover is in process and that the flagged information should be updated to complete the switchover. While the old forwarding information is maintained after the switchover is initiated, the network device will update multicast routing information to identify the new multicast distribution tree as soon as the switchover is initiated.

While the state information indicates that a switchover is in progress, the network device will continue to forward multicast packets received via the old multicast distribution tree. The network device can use the flagged forwarding information when forwarding these multicast packets (e.g., flagged RPF interface information can be used to verify that the multicast packets are being received via the appropriate interface, which is the RPF interface associated with the old multicast distribution tree in this situation).

When the network device receives multicast packets via the new multicast distribution tree, the network device will update routing and/or forwarding information to effect the switchover to the new multicast distribution tree and also update the state information to indicate that a switchover is no longer in process. Once the switchover has completed (e.g., as indicated by the flag being reset to a value that indicates that a switchover is not in process), any multicast traffic received via the old multicast distribution tree will be dropped (since there will not be any routing or forwarding information identifying the old multicast distribution tree).

The network device detects that packets are being received on the new multicast distribution tree when one or more packets addressed to the multicast group are received via the new RPF interface (which is associated with the new multicast distribution tree). Since this RPF interface is not currently identified in the forwarding information associated with that multicast group, any incoming packets received via this interface are dropped (i.e., these packets are not forwarded or routed; however, a copy of a dropped packet may be saved for examination by a route processor). The new RPF interface is configured to also generate an interrupt when a multicast packet is received via an interface other than the RPF interface identified in the forwarding information. The interface can be configured to generate the interrupt in response to receiving a single packet addressed to the multicast group, a prespecified number of packets addressed to the multicast group, or a prespecified rate of packets addressed to the multicast group.

The route processor (e.g., processor 700 in FIG. 6 below) responds to the interrupt by examining the forwarding information for the multicast group as well as the received packet (e.g., to obtain source (S) and group (G) information contained in the packet). Since the forwarding information indicates that a switchover is in progress for the multicast group, the route processor can determine whether the multicast packet was received via the new RPF interface (e.g., as indicated in the routing information for the multicast group). If so, the route processor can update the multicast forwarding information to identify the new multicast tree, clear the flag associated with that multicast forwarding information (so that the flag subsequently indicates that a switchover is no longer in progress), and cause a prune to be sent via the old multicast distribution tree.

It is noted that network device 16(2) can continue to operate (e.g., by routing and/or forwarding packets) normally between the time that the shutdown advertisement is sent and the time that network device 16(2) eventually shuts down. If this time period is selected to be longer than the average time required for the shutdown advertisement to be propagated through the network and for the other network devices to update their multicast routing information in response to the shutdown advertisement, there will be minimal (or even no) disruption of multicast traffic due to the removal of network device 16(2).

As an example of how these techniques can be used, assume that at time T0, multicast packets are being conveyed from multicast source 12 to multicast subscriber 14 via a multicast distribution tree (referred to subsequently as the "old" tree) that includes network devices 16(1), 16(2), and 16(4). Initially, network device 16(2) is present in network 10. Then, network device 16(2) sends a shutdown advertisement to (at least) network devices 16(1) and 16(4). One of these network devices can then forward the shutdown advertisement to network device 16(3).

The unicast routing protocol in use within network 10 detects this imminent change in topology and updates the unicast routing information maintained within network 10 appropriately. A routing protocol (either the unicast routing protocol or a multicast routing protocol) determines that the unicast topology change affects the multicast distribution tree, and that a new multicast distribution tree should be calculated. If the multicast routing protocol is a protocol, such as PIM, that depends upon an underlying unicast routing protocol, the underlying unicast routing protocol can determine whether the topology change affects the multicast distribution tree and, if so, alert the multicast routing protocol. Some multicast routing protocols that do not depend upon an underlying unicast routing protocol can be configured to make this determination on their own, in response to detecting a shutdown advertisement.

Once a routing protocol determines that the multicast distribution tree is affected by the imminent topology change, the multicast routing protocol determines that multicast traffic for the multicast group should be conveyed via a new multicast distribution tree, which includes network devices 16(1), 16(3), and 16(4). In response to detecting this situation, affected nodes, such as network device 16(4), will begin the process of switching from the old tree (which includes network devices 16(1), 16(2), and 16(4)) to the new tree (which includes network devices 16(1), 16(3), and 16(4).

In response to identifying the new tree, network device 16(4) updates its multicast routing information (e.g., stored in a routing information base (RIB)) and sends a join message to network device 16(3). Network device 16(4) does not send a prune message via the old multicast distribution tree, however, nor does network device 16(4) remove the forwarding information corresponding to the old multicast distribution tree. Instead, network device 16(4) updates a flag associated with that forwarding information (e.g., RPF interface information in a multicast forwarding information base (MFIB)) to indicate that a switchover is in progress. Since the forwarding information still identifies the old multicast distribution tree, network device 16(4) continues to forward multicast traffic received via the old tree (i.e., multicast packets received from network device 16(2)).

Network device 16(2) receives the join message. Since network device 16(2) has not received any prior join messages for this multicast group G, network device 16(2) has not established any multicast forwarding state for multicast group G. Accordingly, network device 16(2) creates multicast forwarding state for multicast group G (identifying the interface leading to network device 16(4) in the outgoing interface list) and sends a join message to network device 16(1).

Network device 16(1) receives the join message. Network device 16(1) already maintains multicast forwarding state for multicast group G (since network device 16(1) is also part of the old multicast tree), network device 16(1) adds the interface leading to network device 16(3) to its outgoing interface list for multicast group G. At this point, multicast traffic will begin flowing to network device 16(4) via the new multicast tree.

Now, network device 16(4) will begin receiving the multicast traffic via the new tree. One or more of the first multicast packets received via the new tree will be dropped (e.g., since those packets are received via an interface other than the RPF interface currently identified in the MFIB). However, the receipt of such packets also triggers processing that will complete the switchover to the new multicast distribution tree. In particular, in response to receiving multicast packets addressed to the multicast group via the new RPF interface (which leads to network device 16(3)), network device 16(4) will update the forwarding information to identify the new multicast distribution tree (e.g., by updating the MFIB to identify the new RPF interface) and send a prune message specifying multicast group G to network device 16(3). Network device 16(4) will also clear the flag associated with the multicast forwarding information to indicate that the switchover is no longer in progress. At this point, network device 16(4) also begins forwarding multicast traffic received via the new tree (i.e., multicast packets received from network device 16(3)) and dropping multicast traffic received via the old tree (i.e., multicast packets received from network device 16(2)).

In response to the prune message, network device 16(3) removes the interface leading to network device 16(4) from its outgoing interface list for multicast group G. If network device 16(3) now has no interfaces in its outgoing interface list for that multicast group, network device 16(3) will also send a prune message to network device 16(1). In response to this prune message, network device 16(1) removes the interface that sends packets to network device 16(3) from its outgoing interface list for multicast group G.

Figure 2:
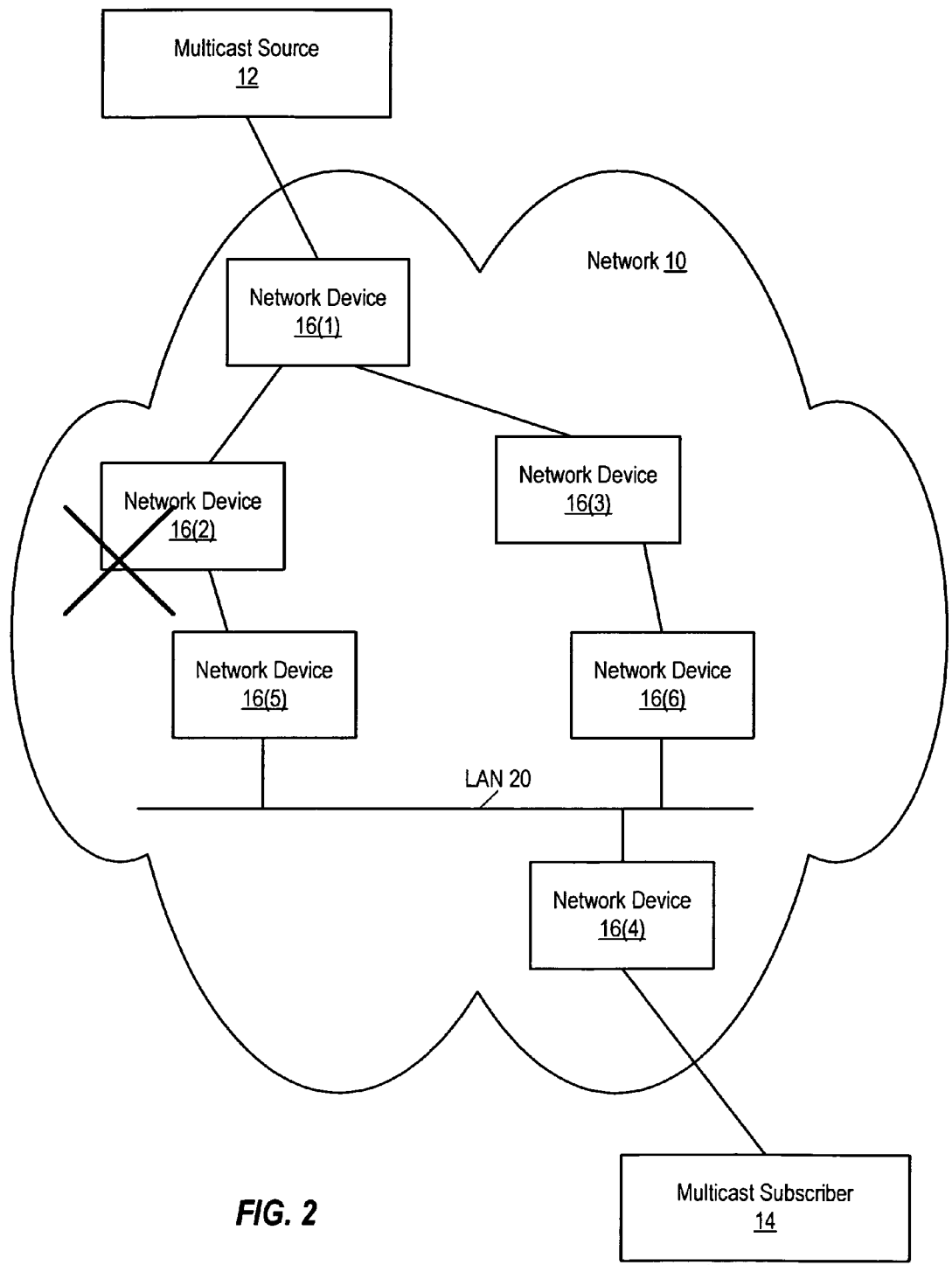
FIG. 2 is a block diagram of another network, according to one embodiment of the present invention.

FIG. 2 is a block diagram of a network in which several network devices are coupled to a multi-access local area network (LAN), labeled LAN 20. In this example, network 10 includes network devices 16(1)-16(6). Networks 16(4), 16(5), and 16(6) are coupled by multi-access LAN 20.

As in the example network of FIG. 1, the network of FIG. 2 experiences a situation in which network device 16(2) is removed from operation. Prior to being removed (e.g., due to being shutdown), network device 16(2) sends a shutdown advertisement throughout the network.

In this situation, when network device 16(4) receives the shutdown advertisement and detects that the imminent topology change will affect the multicast distribution tree that includes network devices 16(1), 16(2), and 16(5). Network device 16(4) then identifies that it should switch over to a new multicast distribution tree that includes network devices 16(1), 16(3), and 16(6). Accordingly, network device 16(4) begins switching over to the new multicast distribution tree in response to the shutdown advertisement.

In this situation, the RPF interface for the new multicast distribution tree will be the same as the RPF interface for the old multicast distribution tree. For both trees, the RPF interface is the interface connected to LAN 20. In this situation, network device 16(4) may not update the forwarding information corresponding to the affected multicast group during the switchover. Instead, network device 16(4) will simply update the multicast routing information to identify the new RPF neighbor (network device 16(6)) and will begin sending join messages to network device 16(6) via the RPF interface (previously, network device 16(4) sent join messages to network device 16(5), which is part of the old multicast distribution tree). Since the RPF interface does not change, network device 16(6) does not need to update any forwarding information.

The join message will cause network device 16(6) (and subsequently network device 16(3)) to create state information for multicast group G. When the join is propagated to network device 16(1), network device 16(1) will add the interface leading to network device 16(3) to the outgoing interface list for multicast group G and, consequentially, multicast data traffic will begin flowing to network device 16(4) via the new multicast distribution tree.

In this example, network device 16(4) is unable to differentiate between multicast data traffic sent via the old and new multicast distribution trees, since both types of traffic will be received via the same RPF interface. This prevents network device 16(4) from being able to determine whether multicast traffic is being received via the new tree. Accordingly, in this embodiment, network device 16(6) may not send any prune messages on the old multicast distribution tree when performing the switchover. Instead, when network device 16(6) begins sourcing multicast data traffic on LAN 20, network devices 16(5) and 16(6) can be configured to detect that both devices are sourcing the same data traffic. In response, network devices 16(5) and 16(6) will both generate an assert message. The device with the lowest metric in its assert message will continue to source the multicast traffic on LAN 20; the other device will cease to send that multicast stream on LAN 20. It is noted that, from the time that both upstream devices source the multicast data traffic until the time at which the assert messages are exchanged and processed, network device 16(4) may receive and forward duplicate multicast packets.

The metrics included in the assert messages can be selected to indicate which of network devices 16(5) and 16(6) has more recently received a join message for the multicast group via LAN 20. In other words, the metrics can indicate how recently the sending devices have refreshed respective routing information for the multicast group. In some embodiments, the metric used by each network device can be (or can be derived from) the time since that network device last received a join message for the multicast group. Alternatively, the network devices can use conventional metric selection techniques and then insert information indicating when a join was last received as an additional field in the assert message. This additional field can then be used to select the device that will continue to source multicast packets onto LAN 20. The assert messages can be sent according to a routing protocol such as PIM.

In this example, network device 16(6) has most recently received a join message for multicast group G, so it can generate an assert message with a relatively low metric on LAN 20. Since network device 16(5) has not received a join message on LAN 20 for multicast group G recently (network device 16(4) stopped sending joins to network device 16(5) when it began sending joins to network device 16(6)), network device 16(5) can select a relatively high value (e.g., a value representing infinity) for its assert message metric, thus guaranteeing that network device 16(6) will win the right to source the multicast data stream on LAN 20.

Figure 3:
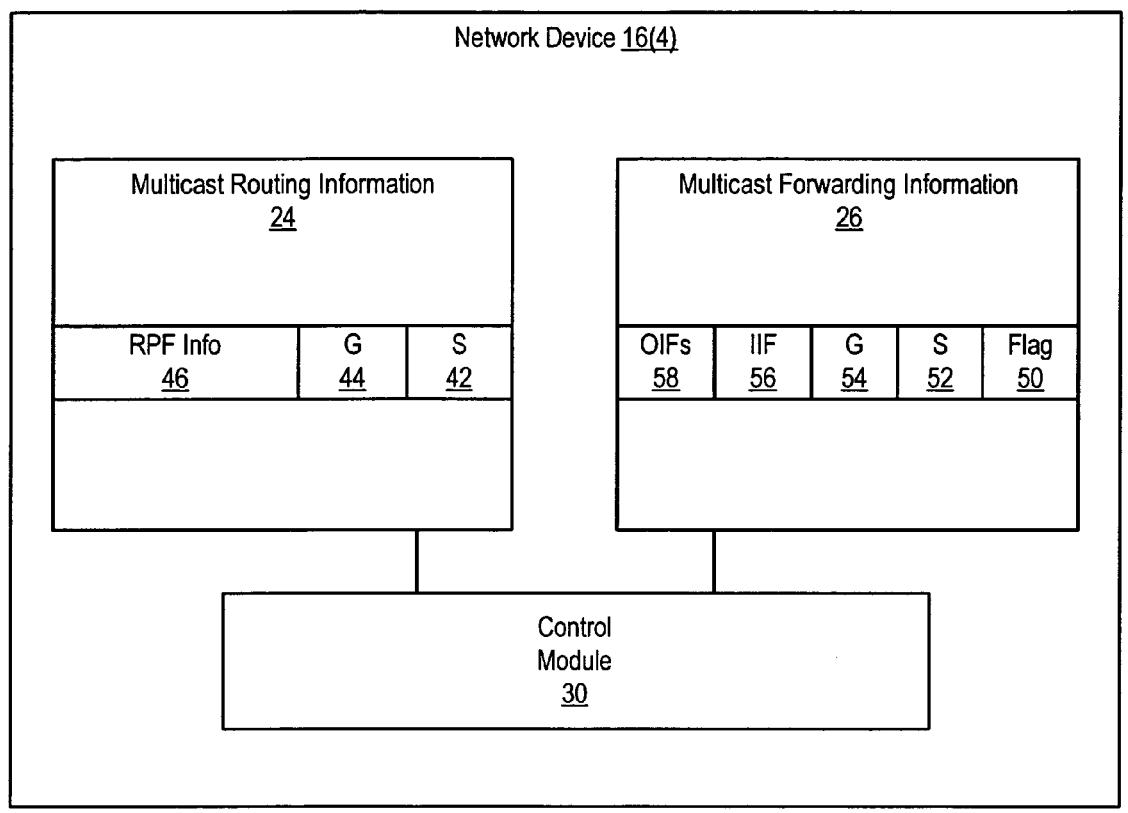
FIG. 3 is a block diagram of a network device that is configured to reroute multicast traffic in response to detecting an imminent network disruption, according to one embodiment of the present invention.

FIG. 3 is a block diagram of a network device 16(4) (e.g., as shown previously in FIGS. 1 and 2). Network device 16(4) is configured to begin switching between multicast trees in response to detecting an imminent topology change.

Network device 16(4) includes storage for multicast routing information 24, storage for multicast forwarding information 26, and a control module 30. Network device 16(4) can also include one or more interfaces that are coupled to send packets to and receive packets from another network device. Each interface can be a logical interface (e.g., an aggregated interface or Ether Channel) or physical interface.

Control module 30 is configured to perform multicast routing based on the stored multicast routing information 24. Control module 30 is also configured to update the stored multicast forwarding information 26. Control module 30 can also include and/or be coupled to a forwarding engine (not shown) that is configured to forward multicast data packets using the stored multicast forwarding information 26. Control module 30 can implement one or more instances of a unicast routing protocol and one or more instances of a multicast routing protocol.

Information 42, 44, and 46 provides an example of the routing information that can be stored for a particular multicast group. As shown, this information identifies a source address (S) 42, a group address (G) 44, and reverse path forwarding (RPF) information 46. The RPF information can identify which interface within network device 16(1) properly receives multicast data packets addressed to group G as well as the RPF neighbor (the device, reached via the RPF interface, that is located upstream (i.e., closer to the multicast source and/or rendezvous point) from network device 16(4) in the multicast distribution tree for group G. The RPF information thus identifies the interface and/or neighboring network device used to reach the root of the multicast tree for group G (e.g., the root of the multicast tree can be the rendezvous point associated with group G). The storage for multicast routing information 24 is, in one embodiment, implemented as a Multicast Routing Information Base (MRIB).

Information 50, 52, 54, 56, and 58 provides an example of the forwarding information that can be stored for a particular multicast group. As shown, this information includes a flag 50, a source address (S) 52, a group address (G) 54, an incoming interface (IIF) list 56 (which identifies the RPF interface), and an outgoing interface (OIF) list 58. A forwarding engine uses the information to forward multicast data packets addressed to multicast group G. For example, when a packet having destination address G is received, the forwarding engine accesses entry 50 and verifies the source address and incoming interface of the packet. If the packet was received via an interface other than the one identified in EIF 56, the packet is dropped. If the packet matches the information in entry 50, the packet is forwarded from the interfaces listed in OWF 58. The storage for multicast routing information 24 is, in one embodiment, implemented as a Multicast Forwarding Information Base (MFIB).

When control module 30 detects an imminent topology change (e.g., in response to network device 16(4) receiving a shutdown advertisement via an interface), control module 30 determines whether the topology change will affect any multicast trees to which network device 16(4) is currently joined. If so, control module 30 can begin switching to a new tree by sending join messages on the new tree while continuing to receive and forward multicast data traffic via the old tree.

When detection of an imminent topology change causes network device 16(4) to initiate a switchover to a new multicast distribution tree, control module 30 can initiate the switchover by updating RPF information 46 to identify the new RPF interface and/or neighbor in the new multicast distribution tree. Control module 30 will also update flag 50 to indicate that a switchover is in progress. Once RPF information 46 is updated, network device 16(4) will begin sending join messages to the RPF neighbor identified in RPF information 46. Control module 30 will prevent any prune messages from being sent to the old RPF neighbor (in the old multicast distribution tree) until multicast data traffic is received via the new multicast distribution tree.

While IIF 56 identifies the old RPF interface and flag 50 is set to indicate a switchover in progress, network device 16(4) will forward multicast traffic for group G via the old multicast distribution tree and drop multicast packets addressed to group G received via the new multicast distribution tree. Receipt of one or more multicast packets addressed to group G via the new multicast distribution tree will cause control module 30 to begin completing the switchover, however. The number and/or rate of multicast packets needed to trigger completion of the switchover can, in some embodiments, be configured by an administrator (e.g., an administrator can configure the rate of multicast packets needed to be received via the new RPF interface prior to generating an interrupt to control module 30).

When network device 16(4) receives data traffic via the new multicast distribution tree, network device 16(4) updates IEF 56 in multicast forwarding information 26 to identify the new RPF interface for the new multicast distribution tree. This causes network device 16(4) to forward multicast data packets received via the new multicast tree and to drop multicast data packets received via the old multicast tree. Network device 16(4) also sends a prune message on the old multicast tree and clears flag 52.

In some embodiments, the new RPF interface may be the same as the old RPF interface. In such embodiments, control module 30 can detect that forwarding information 26 (and particularly IIF 56) will not need to be updated to effect the switchover. In such a scenario, control module 30 may not update flag 52 upon initiation and completion of a switchover.

Figure 4:
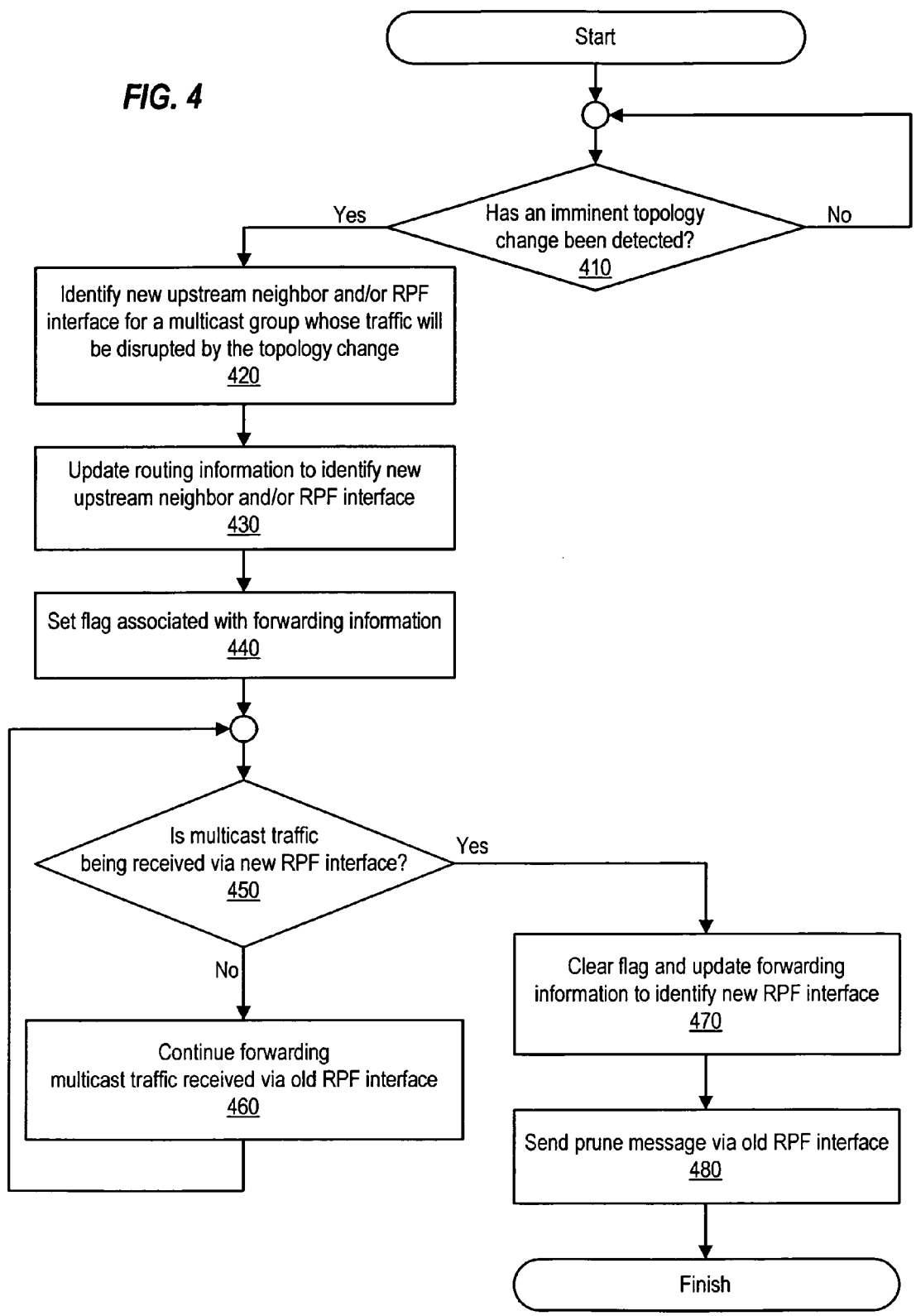
FIG. 4 is a flowchart of a method performed by a network device that detects an imminent network disruption, according to one embodiment of the present invention.

FIG. 4 is a flowchart of a method that involves switching between multicast distribution trees in response to detection of an imminent topology change. This method can be performed by a node such as network device 16(4) of FIGS. 1 and 2 in order to switch to a new multicast tree in certain circumstances.

The method begins at 410, when the node detects an imminent topology change that will affect an established multicast tree used to convey multicast data packets to group G. The node can detect the imminent topology change in response to receiving a shutdown advertisement. A routing protocol (unicast or multicast) can determine that a multicast tree will be affected by the imminent topology change and initiate the method of FIG. 4.

The node then identifies a new upstream neighbor (another node) and/or new RPF interface for the affected multicast group G whose traffic will be disrupted by the topology change, as shown at 420. In other words, the node identifies a new multicast distribution tree for that multicast group. It is noted that in some embodiments (e.g., such as those in which the node is coupled to the multicast source via a multi-access LAN), the new RPF interface may be the same as the old RPF interface.

The node then updates its routing information for multicast group G to identify the new RPF interface and/or neighbor, as shown at 430. This causes the node to begin sending join messages for multicast group G to the new RPF neighbor and to stop sending join messages for multicast group G to the old RPF neighbor.

The node can also set a flag that is associated with the forwarding information for multicast group G, to indicate that a switchover is in progress, as shown at 440. The node will continue to maintain forwarding information that identifies the old multicast distribution tree for multicast group G, however, and will also continue to forward multicast traffic received via the old multicast distribution tree.

Until multicast traffic addressed to multicast group G is received via the new RPF interface and/or from the new RPF neighbor (as determined at 450), the node continues to forward multicast traffic received via the old RPF interface and/or from the old RPF neighbor, as indicated at 460.

Once a certain amount of multicast traffic for group G is received via the new RPF interface and/or from the new RPF neighbor, the node can clear the flag (set at 440) and update the forwarding information to identify the new RPF interface, as shown at 470. This causes the node to begin forwarding multicast packets addressed to group G that are received via the new RPF interface and to drop multicast packets addressed to group G that are received via the old RPF interface. The node can also send a prune message via the old RPF interface, as shown at 480.

It is noted that other embodiments can include different operations instead of and/or in addition to those shown above. Furthermore, in some embodiments (e.g., such as those in which the new RPF interface is the same as the old RPF interface), operations 440-480 may not be performed. Instead, the node can effect the switchover by simply performing operations 420 and 430.

Figure 5:
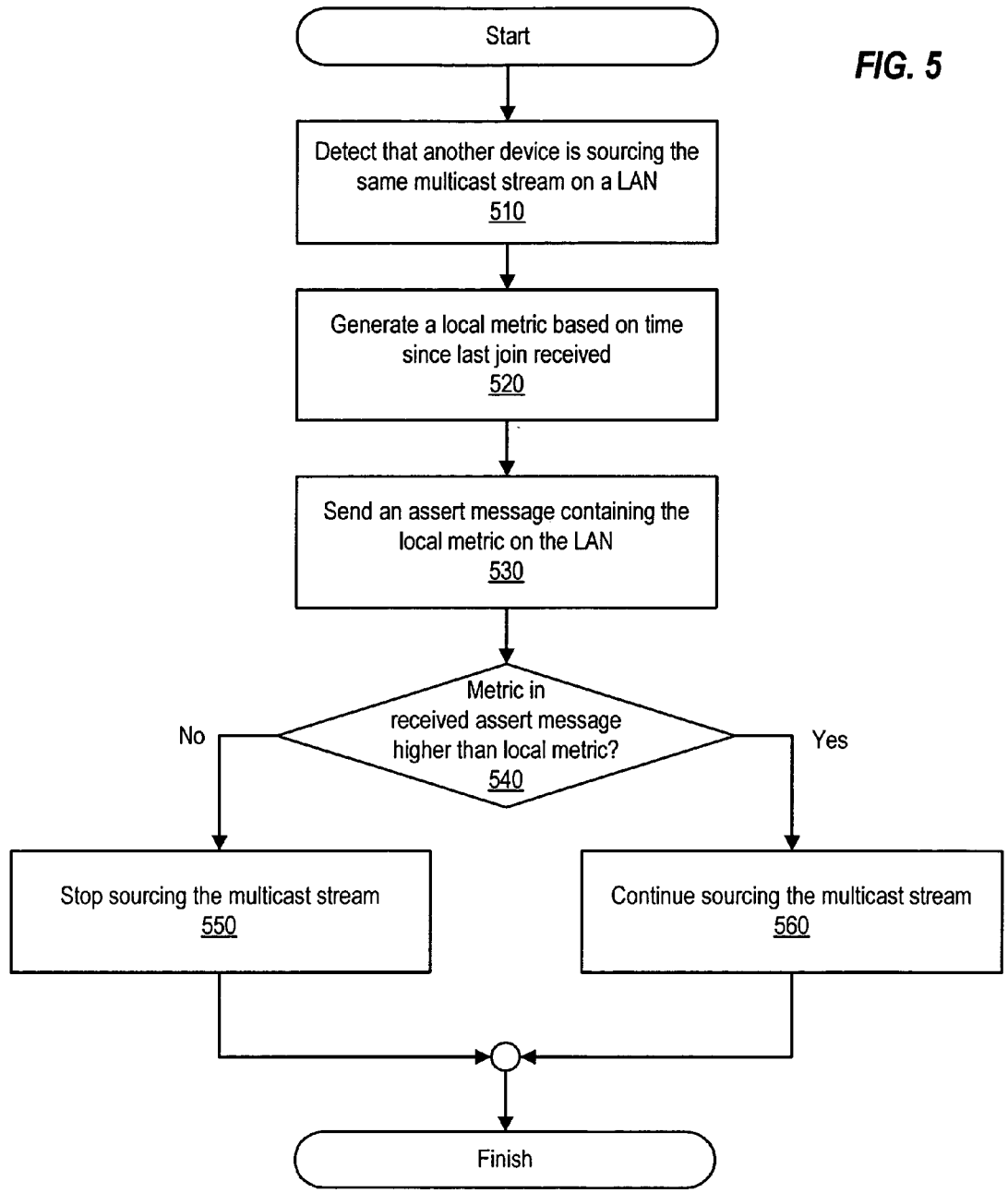
FIG. 5 is a flowchart of a method performed by a network device that is sourcing a multicast data stream onto a multi-access local area network, according to one embodiment of the present invention.

FIG. 5 is a flowchart of one example of a method that can be used by nodes that are sourcing the same multicast data stream onto a multi-access LAN. The method can be performed by a node such as one of network devices 16(5) and 16(6) of FIG. 2.

The method begins at 510, when the node, which is sourcing a multicast stream on a multi-access LAN, detects that another device is sourcing the same multicast stream on the LAN. If both the node and the other device are sending packets to the same multicast group, the node and the other device are sourcing the same multicast stream. This creates the risk of packet duplication on the LAN. Operation 510 can be performed using convention techniques for avoiding packet duplication on a multi-access LAN.

In response to detecting that another device is sourcing the same multicast stream, the node generates a local metric that is based on the amount of time that has elapsed since the node last received a join message, via the LAN, specifying the multicast group, as shown at 520. This metric can be a value representing the amount of time (e.g., copied from a counter used to determine when multicast state information associated with the multicast group expires) or a value that is derived from the amount of time.

The node then sends an assert message, which includes the local metric, onto the LAN, as shown at 530. The format of the assert message can be specified by a routing protocol such as PIM. The assert message can identify the multicast group to which both devices are sending multicast packets as well as the Internet Protocol (IP) address of the sending device. The assert message can include the local metric in a cost field (which is conventionally used to indicate the relative "cost," e.g. in terms of network hops, of sending packets from the multicast source to the sending node) or in a special field dedicated to conveying information indicating the time elapsed since a join was received.

The node then waits to receive a corresponding assert message (if one has not already been received) from the other device that is sourcing the multicast stream. If the corresponding metric (which indicates the time elapsed since the other device received a join message for the multicast group via the LAN) in that assert message is higher than the local metric, as determined at 540, the node will continue to source the multicast stream onto the LAN, as shown at 560. If the metric in the assert message is lower than the local metric, the node will stop sourcing the multicast stream, at 550. If the metric is equal to the local metric, the node can use other information (e.g., such as cost information or IP addresses) to determine whether to continue sourcing the multicast stream onto the LAN.

Figure 6:
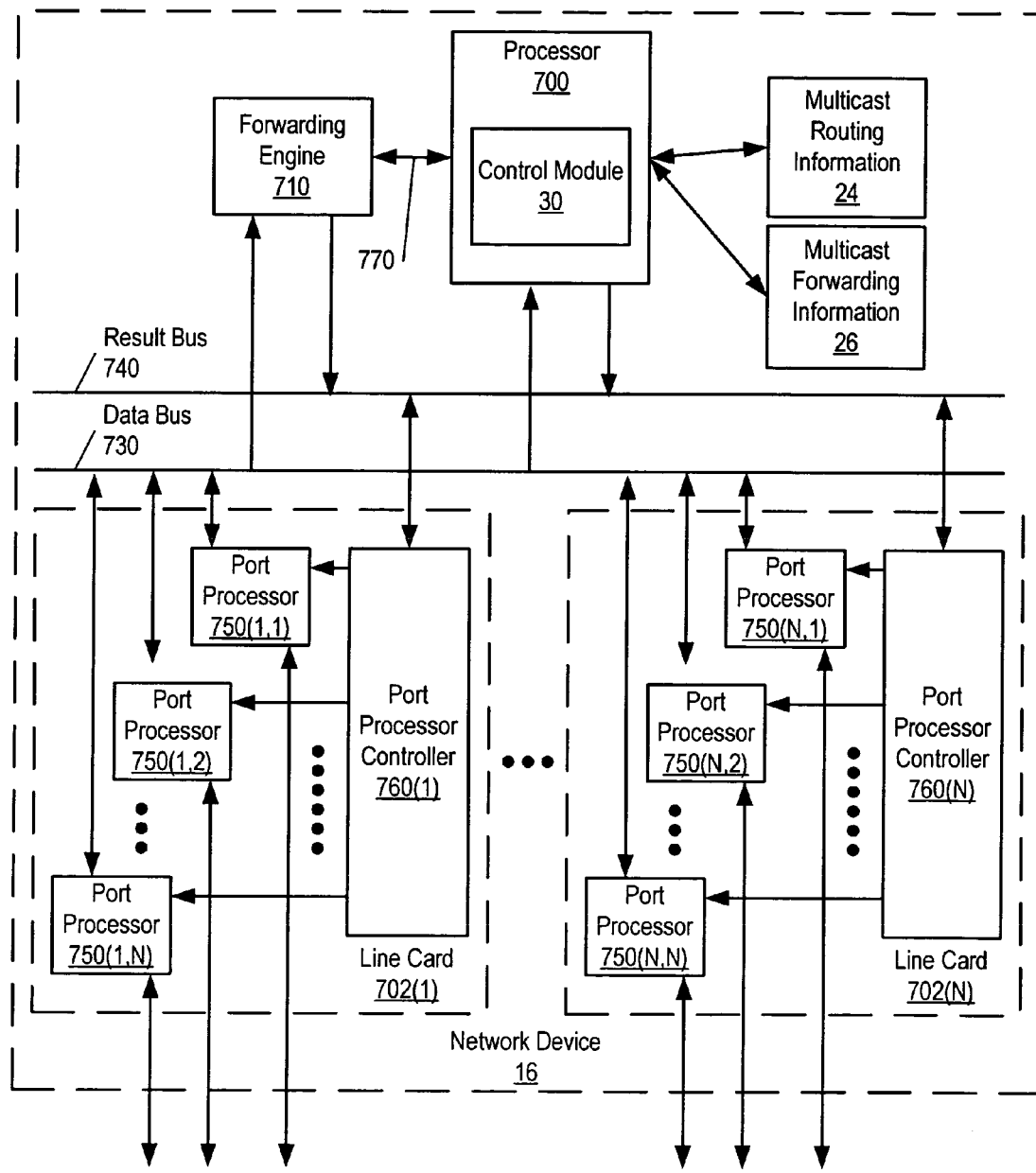
FIG. 6 is a block diagram of a network device, according to one embodiment of the present invention.

FIG. 6 is a block diagram of a network device 16 (e.g., one of network devices 16(1)-16(6) of FIGS. 1 and 2). In this depiction, network device 16 includes a number of line cards (line cards 702(1)-702(N)) that are communicatively coupled to a forwarding engine 710 and a processor 700, which includes a control module 30 via a data bus 730 and a result bus 740. Control module 30 is coupled to maintain multicast routing information 24 and multicast forwarding information 26 (e.g., as shown in FIG. 3). Control module 30 can perform the methods of FIGS. 4 and/or 5.

Line cards 702(1)-702(N) include a number of port processors 750(1,1)-750(N,N) which are controlled by port processor controllers 760(1)-760(N). It will also be noted that forwarding engine 710 and route processor 700 are not only coupled to one another via data bus 730 and result bus 740, but are also communicatively coupled to one another by a communications link 770. It is noted that in alternative embodiments, each line card can include a forwarding engine.

When a message (e.g., a shutdown advertisement, join message, or the like) is received, the message is identified and analyzed by a network device such as network device 16 in the following manner, according to embodiments of the present invention. Upon receipt, a message (or some or all of its control information) is sent from the one of port processors 750(1,1)-750(N,N) at which the message was received to one or more of those devices coupled to data bus 730 (e.g., others of port processors 750(1,1)-750(N,N), forwarding engine 710 and/or route processor 700). Handling of the message can be determined, for example, by forwarding engine 710. For example, forwarding engine 710 may determine that the message should be forwarded to one or more of port processors 750(1,1)-750(N,N). This can be accomplished by indicating to corresponding one(s) of port processor controllers 760(1)-760(N) that the copy of the message held in the given one(s) of port processors 750(1,1)-750(N,N) should be forwarded to the appropriate one of port processors 750(1,1)-750(N,N).

Figure 7:
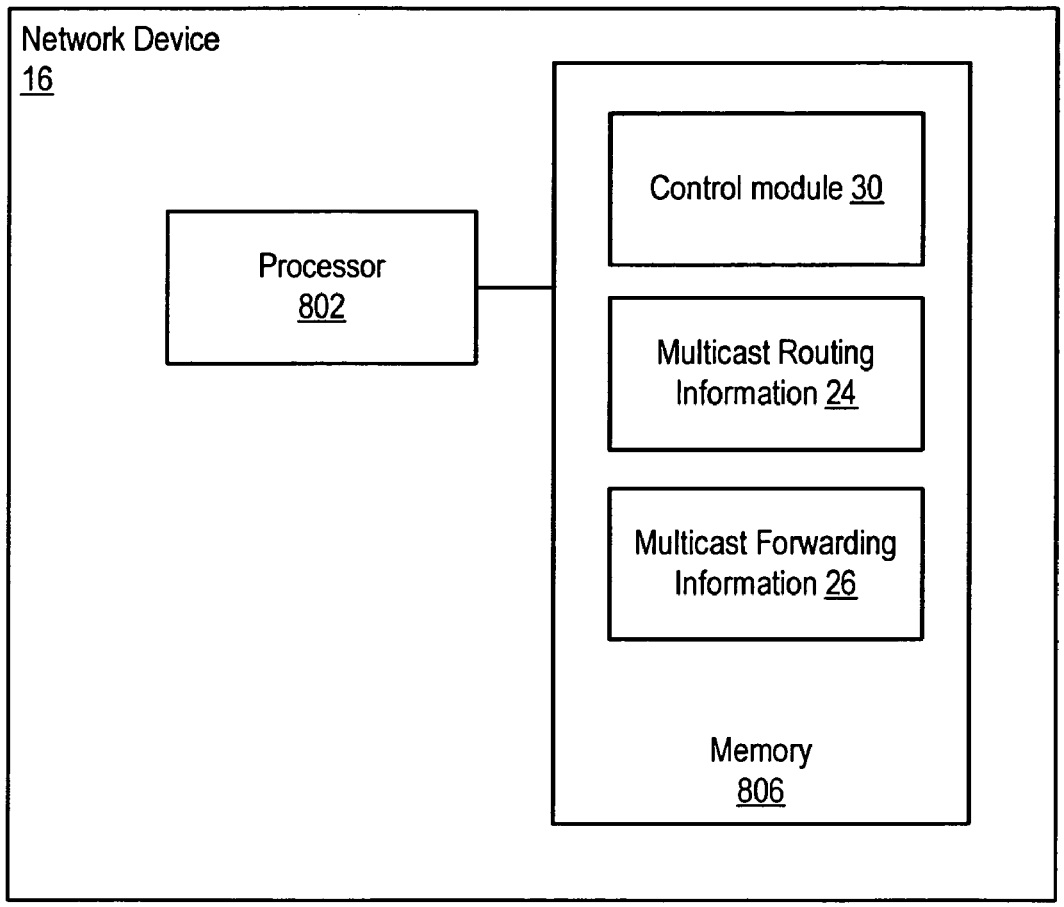
FIG. 7 is another block diagram of a network device, according to one embodiment of the present invention.

FIG. 7 illustrates a block diagram of a network device 16, which illustrates how control module 30 (e.g., as shown in FIG. 6) can be implemented in software. As illustrated, network device 16 includes one or more processors 802 (e.g., microprocessors, PLDs (Programmable Logic Devices), or ASICs (Application Specific Integrated Circuits)) configured to execute program instructions stored in memory 806. Memory 806 can include various types of RAM (Random Access Memory), ROM (Read Only Memory), Flash memory, MEMS (Micro Electro-Mechanical Systems) memory, and the like. Processor 802 and memory 806 can be included in a route processor (e.g., route processor 700 of FIG. 6). Processor 802 and memory 806 are coupled to send and receive data and control signals by a bus or other interconnect.

In this example, program instructions executable to implement control module 30 are stored in memory 806. Additionally, multicast routing information 24 and multicast forwarding information 26 can also be stored in memory 806 for use by control module 30. The program instructions and data implementing control module 30 can be stored on various computer readable media such as memory 806. In some embodiments, control module 30 software is stored on a computer readable medium such as a CD (Compact Disc), DVD (Digital Versatile Disc), hard disk, optical disk, tape device, floppy disk, and the like). In order to be executed by processor 802, the instructions and data implementing control module 30 are loaded into memory 806 from the other computer readable medium. The instructions and/or data implementing control module 30 can also be transferred to network device 16 for storage in memory 806 via a network such as the Internet or upon a carrier medium. In some embodiments, a computer readable medium is a carrier medium such as a network and/or a wireless link upon which signals such as electrical, electromagnetic, or digital signals, on which the data and instructions implementing control module 30 are encoded, are conveyed.

Although the present invention has been described in connection with several embodiments, the invention is not intended to be limited to the specific forms set forth herein. On the contrary, the present invention is intended to cover such alternatives, modifications, and equivalents as can be reasonably included within the scope of the invention as defined by the appended claims.

What is claimed is:

1. A method comprising:
   detecting an imminent topology change;
   identifying a new multicast distribution tree for a multicast group, in response to detection of the imminent topology change;
   sending a join message towards a root of the new multicast distribution tree;
   maintaining forwarding information subsequent to sending the join message, wherein the forwarding information identifies a current multicast distribution tree instead of the new multicast distribution tree;
   continuing to forward multicast traffic addressed to the multicast group via the current multicast distribution tree, subsequent to sending the join message;
   receiving a multicast packet addressed to the multicast group via the new multicast distribution tree, subsequent to sending the join message;
   dropping the multicast packet in response to the forwarding information corresponding to the multicast group not identifying the new multicast distribution tree, subsequent to sending the join message; and
   updating the forwarding information corresponding to the multicast group to identify the new multicast distribution tree, in response to the receiving; wherein
      the detecting, the identifying, the sending, the maintaining, the continuing to forward, the receiving, the dropping, and the updating are performed by a network device.

2. The method of claim 1, further comprising:
   forwarding subsequent multicast traffic addressed to the multicast group using the new multicast distribution tree instead of the current multicast distribution tree, in response to the updating the forwarding information.

3. The method of claim 2, further comprising:
   updating routing information corresponding to the multicast group, in response to detection of the imminent topology change, wherein the routing information identifies a new reverse path forwarding neighbor subsequent to being updated.

4. The method of claim 1, wherein the detecting the imminent topology change comprises:
   receiving a shutdown advertisement from a node, wherein the node is located in the current multicast distribution tree.

5. The method of claim 1, wherein
   the identifying a new multicast distribution tree comprises identifying a new reverse path forwarding neighbor, and
   the join message is sent to the new reverse path forwarding neighbor.

6. The method of claim 5, wherein the identifying the new multicast distribution tree further comprises:
   identifying a new reverse path forwarding interface, wherein the new reverse path forwarding interface is coupled to the new reverse path forwarding neighbor.

7. The method of claim 1, further comprising:
   receiving the join message via a multi-access local area network (LAN), wherein the receiving the join message is performed by a first node;
   sourcing data packets addressed to the multicast group onto the multi-access LAN;
   detecting that an additional node is also sourcing data packets addressed to the multicast group onto the multi-access LAN; and
   determining whether to continue sourcing data packets addressed to the multicast group onto the multi-access LAN, based on whether the additional node has refreshed routing information for the multicast group more recently than the first node.

8. The method of claim 7, further comprising:
   sending an assert message to the additional node, wherein
      the assert message comprises a metric, and
      the metric is indicative of how recently the first node refreshed routing information for the multicast group.

9. A network device comprising:
   a processor;
   a non-transitory storage device for storing multicast state information comprising multicast routing information for a multicast group and multicast forwarding information for the multicast group, wherein the non-transitory storage device is coupled to the processor; and
   a control module coupled to access the multicast state information in the non-transitory storage device, wherein the control module is configured to:
      update the multicast routing information to identify a new multicast distribution tree for the multicast group, in response to detection of an imminent topology change;
      maintain the multicast forwarding information, wherein the multicast forwarding information identifies a current multicast distribution tree instead of the new multicast distribution tree;
      inhibit updating the multicast forwarding information to identify the new multicast distribution tree, until one or more multicast data packets are received via the new multicast distribution tree;
      drop the one or more multicast data packets in response to the multicast forwarding information not identifying the new multicast distribution tree; and
      update the multicast forwarding information associated with the multicast group to identify the new multicast distribution tree, in response to receiving the one or more multicast data packets via the new multicast distribution tree.

10. The network device of claim 9, wherein
    the network device is configured to send a join message towards a root of the new multicast distribution tree, in response to the multicast routing information being updated to identify the new multicast distribution tree; and the network device is configured to continue forwarding multicast traffic addressed to the multicast group via an old multicast distribution tree identified in the multicast forwarding information, prior to the multicast forwarding information being updated.

11. The network device of claim 9, wherein the control module is configured to detect the imminent topology change in response to the network device receiving a shutdown advertisement.

12. A system comprising:
a first network device, wherein
the first network device is configured to:
identify a new multicast distribution tree for a multicast group, in response to detection of an imminent topology change;
send a join message towards a root of the new multicast distribution tree;
maintain forwarding information subsequent to sending the join message, wherein the forwarding information identifies a current multicast distribution tree instead of the new multicast distribution tree;
continue to forward multicast traffic addressed to the multicast group via the current multicast distribution tree, subsequent to sending the join message;
receive a multicast packet addressed to the multicast group via the new multicast distribution tree;
drop the multicast packet in response to the forwarding information for the multicast group not identifying the new multicast distribution tree, subsequent to sending the join; and
update the forwarding information for the multicast group to identify the new multicast distribution tree, in response to receiving the multicast packet.

13. The system of claim 12, wherein the first network device is configured to:
inhibit updating the multicast forwarding information to identify the new multicast distribution tree, until one or more multicast data packets are received via the new multicast distribution tree.

14. The system of claim 12, wherein the first network device is configured to detect the imminent topology change in response to receiving a shutdown advertisement.

15. The system of claim 12, further comprising:
a second network device coupled to the first network device by a multi-access LAN, wherein the second network device is configured to:
source data packets addressed to the multicast group onto the multi-access LAN, in response to receiving the join message;
detect that a third network device is also sourcing data packets addressed to the multicast group onto the multi-access LAN; and
determine whether to continue sourcing data packets addressed to the multicast group onto the multi-access LAN, based on whether the third network device has refreshed routing information for the multicast group more recently than the second network device.

16. The system of claim 15, wherein the second network device is configured to:
send an assert message to the third network device, wherein the assert message comprises a metric, and
the metric is indicative of how recently the second network device refreshed routing information for the multicast group.

17. A system comprising:
non-transitory computer-readable storage means for storing forwarding information for a multicast group;
means for identifying a new multicast distribution tree for the multicast group, in response to detection of an imminent topology change;
means for sending a join message towards a root of the new multicast distribution tree;
means for maintaining forwarding information subsequent to sending the join message, wherein
the forwarding information identifies a current multicast distribution tree instead of the new multicast distribution tree;
means for continuing to forward multicast traffic addressed to the multicast group via the current multicast distribution tree, subsequent to sending the join message;
means for receiving a multicast packet addressed to the multicast group via the new multicast distribution tree;
means for dropping the multicast packet in response to the forwarding information not identifying the new multicast distribution tree; and
means for updating the forwarding information to identify the new multicast distribution tree, in response to receiving the multicast packet.

18. The system of claim 17, further comprising:
means for receiving the join message at a first node;
means for sourcing data packets addressed to the multicast group onto a multi-access LAN;
means for detecting that an additional node is also sourcing data packets addressed to the multicast group onto the multi-access LAN; and
means for determining whether to continue sourcing data packets addressed to the multicast group onto the multi-access LAN, based on whether the additional node has refreshed routing information for the multicast group more recently than the first node.

* * * * *